Dec. 22, 1970   F. T. SMITH ET AL   3,549,213
TRACK TIGHTENER FOR A CRAWLER TYPE VEHICLE
Filed March 5, 1969   2 Sheets-Sheet 1
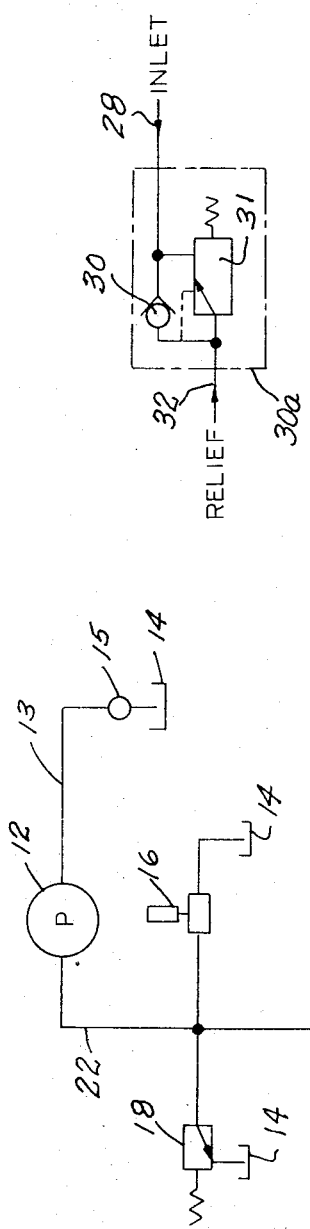
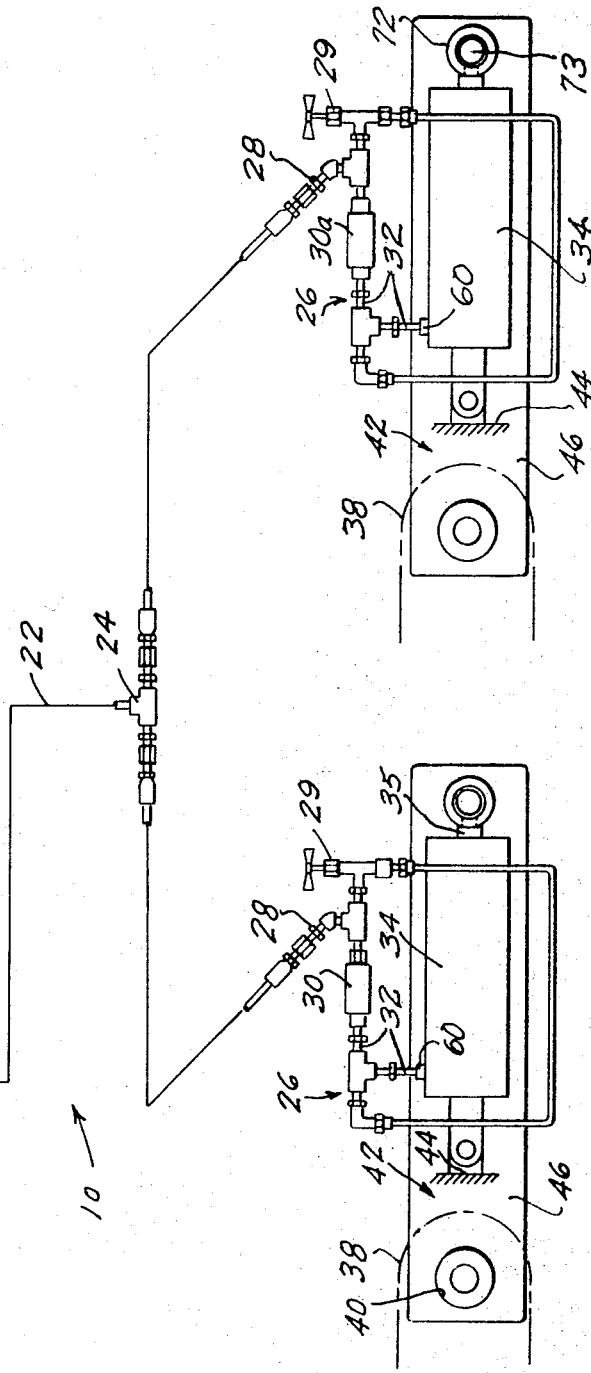
INVENTORS
Fred T. Smith
James J. Gebhardt, Jr.
Hill, Sherman, Meroni, Gross & Simpson
ATTORNEYS Dec. 22, 1970  F. T. SMITH ET AL  3,549,213
TRACK TIGHTENER FOR A CRAWLER TYPE VEHICLE
Filed March 5, 1969  2 Sheets-Sheet 2
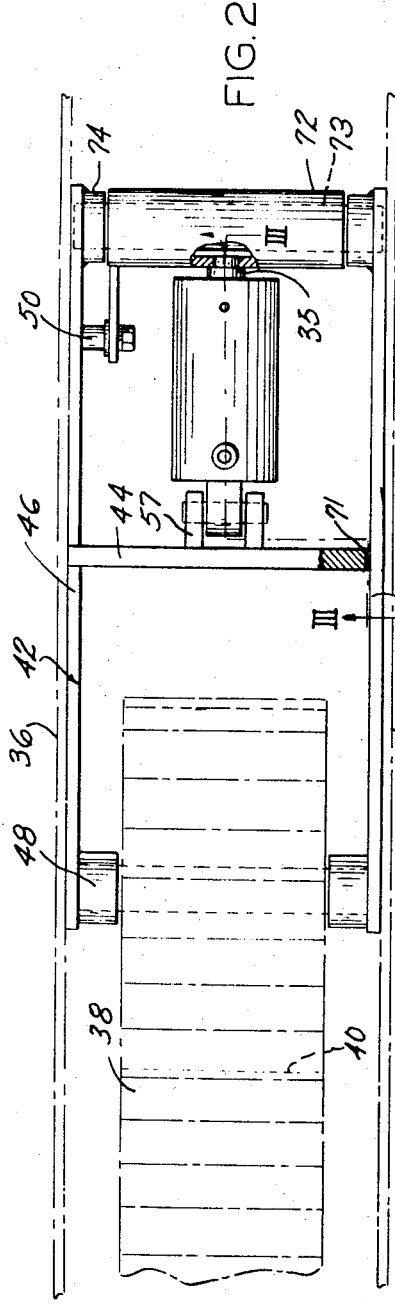
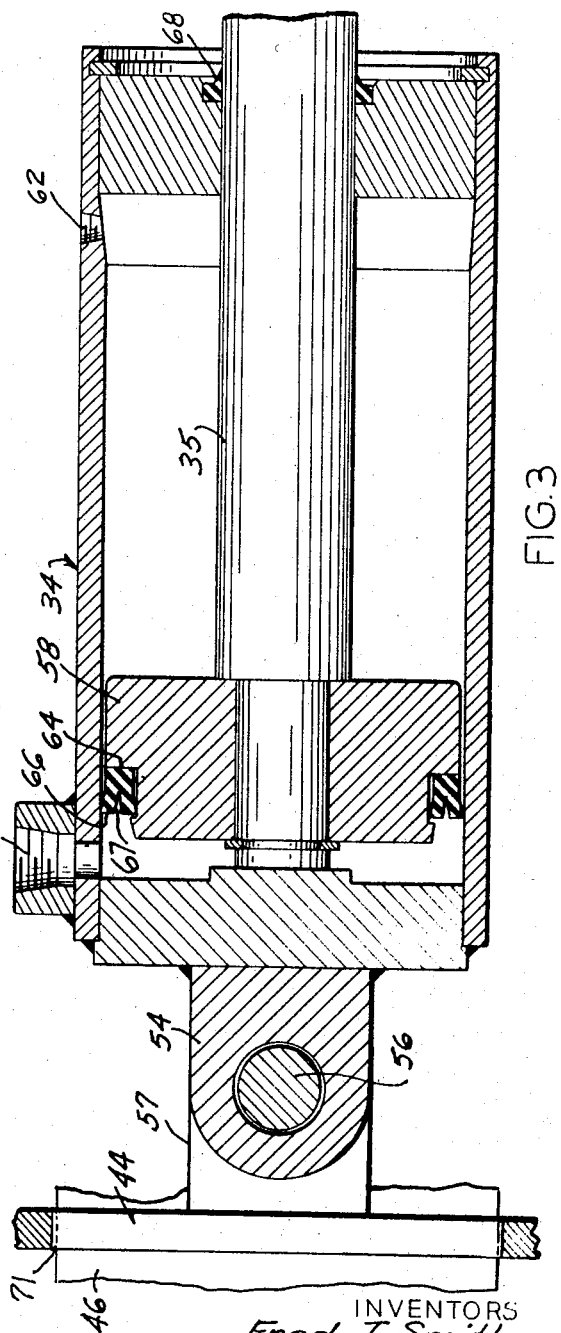
INVENTORS
Fred T. Smith
James J. Gebhardt, Jr.
ATTORNEYS

# United States Patent Office 3,549,213
Patented Dec. 22, 1970

3,549,213
TRACK TIGHTENER FOR A CRAWLER TYPE VEHICLE
Fred T. Smith, 627 Cheyenne St., Aurora, Ill. 60506, and James J. Gebhardt, Jr., 4721 Schwartz St., Lisle, Ill. 60532
Continuation-in-part of application Ser. No. 664,163, Aug. 29, 1967. This application Mar. 5, 1969, Ser. No. 804,644
Int. Cl. B62d 55/30
U.S. Cl. 305—10
7 Claims

ABSTRACT OF THE DISCLOSURE

A track tightener for a crawler type vehicle including a fluid cylinder associated with each track, a take-up idler and sprocket wheel engaging the track, a source of fluid under pressure for the fluid cylinder, and a hydraulic control system to regulate the pressure of the fluid in the cylinder to vary the length of the track path by adjusting the position of the idler wheel to provide automatic self adjustment of the tension in the track.

CROSS REFERENCE TO RELATED APPLICATIONS

This is a continuation-in-part of application Ser. No. 664,163, filed Aug. 29, 1967, now abandoned.

BACKGROUND OF THE INVENTION

Field of the invention

This invention pertains to track tighteners for crawler type vehicles, and more particularly to an automatic self adjusting hydraulic track tightening apparatus.

Description of the prior art

It is known to use a take-up idler to adjust the tension of a track in a crawler type vehicle. All crawlers require a track chain tensioning and take-up means for the track as it elongates due to wear. Additionally, the tracks must be provided with means to permit the centers of the driving end crawler sprocket and the opposite end take-up idler to foreshorten, due to material build up on the sprocket and/or take-up idler, or by any foreign object passing between the track chain and the drive sprocket or take-up idler.

The detensioning apparatus must have sufficient resistance to prevent the take-up idler from recoiling when the crawler is being driven through the top run of the track chain which needs to be approximately twice the maximum designed track pull. This controlled maximum resistance and recoil ability protects the crawler chain and components from destructive overloads.

According to available information the prior art utilizes springs for this latter means, which are by necessity bulky and have to be long to prevent an appreciable increase of resistance as the take-up idler recoils.

The springs are initially adjusted for the maximum desired resistance and are designed such that this force is not translated to the track chain when the crawler is not driving or subjected to build up or passing foreign objects.

The track chain initial tensioning and take-up due to wear is done either by manually operated adjusting screws, or power operated grease rams using a conventional grease gun.

SUMMARY OF THE INVENTION

In accordance with the present invention, a track tightener for a crawler type finisher, which is automatic and self adjusting, includes a fluid cylinder, a member connecting the cylinder with a take-up idler and control means to adjust the position of the member by means of the fluid cylinder to thereby adjust the tension of the track.

Accordingly, it is an object of the present invention to provide a track tightener for a crawler type finisher which is automatic and self-adjusting.

Another object of the present invention is to provide a track tightener for a crawler type finisher which utilizes a hydraulic control system for adjustment of the track tension.

Yet a further object of the present invention is to provide a track tightener which is continuously operable and self balancing.

Still another object of this invention is to provide a track tightener which utilizes a minimum number of components at a consequent minimal cost.

Yet another object of this invention is to provide a hydraulic track tightener having a single hydraulic line from a source of hydraulic fluid to the fluid cylinder.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

Other objects, features and advantages of the present invention will be readily apparent from the following description of a preferred embodiment thereof, taken in conjunction with the accompanying drawings, although variations and modifications may be effected without departing from the spirit and scope of the novel concepts of the disclosure or our contribution to the art, and in which:

FIG. 1 is a schematic and diagrammatic view showing a hydraulically operated track tightener embodying the features of the present invention;

FIG. 1a is a partial schematic view showing a combined check valve and relief valve arrangement encased within a common housing and provided within a hydraulic control system of the track tightener illustrated in FIG. 1;

FIG. 2 is a partial top view of the track tightening apparatus; and

FIG. 3 is an enlarged sectional view taken along line III—III of FIG. 2.

DESCRIPTION OF THE PREFERRED EMBODIMENT

Referring to the drawings, a track tightening apparatus, constructed in accordance with the principles of the present invention, generally includes a hydraulic control system 10 and a pair of hydraulically operated track take-up units 26, 26. Crawler type vehicles are usually provided with a pair of tracks as at 38 disposed on opposite sides of the vehicle and trained around longitudinally spaced sprockets. One of the sprockets (not shown) drives the track and a sprocket or idler as at 40 disposed at an end of the vehicle opposite of the driving sprocket is movable toward and away from the driving sprocket in a manner to maintain the track under a desired tension and to compensate for elongation of the track due to wear at articulation points. Also, means may be provided for permitting movement of the take-up idler sprocket 40 toward the driving sprocket to prevent damage to the track or the sprockets whenever material builds-up on the sprockets or any foreign object passes between the track 38 and the drive sprocket or the take-up idler sprocket.

Resistance to movement of the take-up idler sprocket 40 towards the driving sprocket should be sufficient to prevent the take-up idler sprocket from recoiling as the crawler track is driven through the top run of the track path. Also, the maximum resistance to movement of the take-up idler sprocker 40 toward the driving sprocket should be low enough to prevent over-tensioning the crawler track in a manner which could cause destructive overloads.

Each of the hydraulically operated take-up units 26 are identical, and therefore, the following description will be directed toward the components of only one of these assemblies. The hydraulically operated take-up unit 26 generally includes a fluid operated cylinder 34 disposed longitudinally of the path of movement of the tracks 38 and intermediate a pair of laterally spaced framing members 36, 36 of a crawler type vehicle.

The hydraulic cylinder 34 has a cylindrical bore receiving a piston 58 having a piston rod 35 attached thereto and longitudinally disposed relative of the cylindrical bore. The piston 58 moves between a threaded inlet aperture 60 and an outlet aperture 62. Also, the piston 58 has a cutaway face 64 adapted to receive a piston ring 66 characterized by a circular sealing slit 67 opening toward the inlet end of the cylinder. A sealing gasket 58 forms a seal between the piston rod 34 and an aperture formed in one end of the cylinder 34 and receiving the piston rod for axial movement therethrough.

One end portion of the fluid operated cylinder 34 is rigidly connected to the framing members 36, 36 by attachment means including a transversely extending member 44 secured to the framing members and means pivotally connecting one end portion of the cylinder to the transverse member. The means pivotally connecting one end portion of the cylinder 34 to the transverse member 44 include a pair of apertured projections 57, 57 forming a yoke, an apertured projection 54 extending intermediate of the pair of projections 57, 57 and secured to the cylinder 34, and a pin 56 passing through the projection and secured against axial movement by retaining means such as cotter pins (not shown).

The take-up idler sprocket 40 is rotatably supported in one end portion of a box frame 42 which is mounted for slidable movement relative to the vehicle framing members 36, 36. The box frame member 42 includes a pair of spaced side bars 46, 46 disposed adjacent the framing members 36, 36. The transverse member 44, which has opposite end portions thereof securely affixed to the framing members 36, 36, has notches or cut out portions as at 71 formed at opposite end portions thereof adjacent to the framing members 36, 36. The cut out portions 71 of the transverse member 44 are sized to slidably receive the side bars 46 of the box frame 42 and cooperate with the vehicle framing members 36, 36 to form rectangular openings slidably mounting the box frame 42 for movement relative to the vehicle frame in a direction longitudinally of the crawler track path of movement.

The take-up idler sprocket 40 is mounted at one end portion of the box frame 42, and a shaft supporting the idler sprocket has opposite end portions rotatably received within inwardly projecting apertured bosses 48. Also, the piston rod 35 of the fluid operated cylinder 34 is secured to the box frame 42 at an end thereof opposite the take-up idler sprocket 40, thereby to move the idler sprocket 40 longitudinally of the crawler track path of movement whenever the piston 58 and the piston rod 35 moves relative to the cylindrical housing of the fluid operated cylinder 34. The outermost end portion of the piston rod 35 securely engages a sleeve 72 which is supported on a shaft 73 having opposite end portions thereof supported within apertured bosses as at 74 formed on the side bars 46, 46 of the box frame 42. An arm 50 extends radially of the sleeve 72 and is secured to one of the side bars 46, thereby to anchor the sleeve 72 to the box frame 42 for preventing rotational movement of the sleeve.

Also, in accordance with the principles of the present invention, means supplying a source of pressurized hydraulic fluid to the hydrauic control system 10 are provided for normally supplying the hydraulic or fluid operated power cylinders 34 with hydraulic fluid at a minimum pressure for maintaining the crawler tracks 38 under normal operating tension and to present a higher resistance to movement of the take-up unit toward the driving sprocket disposed at the opposite end of the path of movement of the crawler track. The source of pressurized fluid includes a pump 12 connected to a reservoir 14 containing a source of hydraulic fluid by an inlet line 13 characterized by a straining device 15 interposed between the reservoir and the pump to remove suspended particles from the hydraulic fluid. An outlet line 22 extends from an outlet of the pump 12 and delivers pressurized hydraulic fluid to the hydraulic control system 10. A pump bypass or main control valve 16, when in an open position, returns the pressurized fluid to the reservoir 14. When the bypass valve 16 is in a closed position, the pressurized fluid delivered by the pump 12 is maintained at a maximum pressure by a first pressure relief valve 18 connected in parallel with the pump 12 and the bypass valve 16.

The pump outlet line 22 terminates in a T connection 24 having a pair of fluid transmission lines 28, 28 extending therefrom and passing fluid to hydraulically operated track take-up units 26, 26, thereby to deliver hydraulic fluid to the take-up units at a pressure determined by the first pressure relief valve 18.

Also, in accordance with the principles of the present invention, each of the fluid transmission lines 28 delivers fluid to a second bypass valve 29, a check valve 30 and a second pressure relief valve 31 interconnected in a parallel arrangement. The bypass valve 29, the check valve 30 and the pressure relief valve 31 deliver fluid to the input 60 of the hydraulic cylinder 34 through the transmission line 32. In normal operation, the bypass valve 29 is in a closed position, but if it is desired to bypass the second pressure relief valve 31 and the check valve 30, the bypass valve 29 is opened.

As illustrated in FIG. 1a, the check valve 30 and the second pressure relief valve 31 are interconnected in a parallel arrangement and encased within a common housing 30a having one input and one output line.

In operation, hydraulic fluid at a pressure determined by the first pressure relief valve 18 passes from the pump through the transmission lines 22 and 28, the check valve 30, the inlet line 32 and into the power cylinder 34 causing the piston rod 35 to be urged outwardly of the cylinder 34, thereby to urge the box frame 32 carrying the take-up idler sprocket 40 in a direction to hold the crawler track 38 under a tension proportional to the pressure of the hydraulic fluid. In the event that an obstruction is encountered such as for instance a rock or a piece of wood being jammed between the idler sprocket 40 or the driving sprocket and the crawler track 38, the piston rod 35 will be urged inwardly of the fluid operated cylinder 34 causing an increase in the pressure of the fluid within the power cylinder. The increased pressure closes the check valve 30 and directs a reverse flow of fluid through the second pressure relief valve 31. When the increased pressure within the cylinder 34, resulting from an obstruction passing between the track 38 and the supporting sprockets or idlers, exceeds a predetermined pressure at which the pressure relief valve 31 opens, a reverse flow of fluid passes through the transmission lines 22 and 28 and the first pressure relief valve 18, thereby to permit the take-up idler sprocket 40 to move toward the driving sprocket to permit the obstruction to pass between the sprockets and the track 38 without causing damage. Thus, the requisite pressure or tension within the track 38 will cause the take-up idler sprocket to move toward the driving sprocket is determined by the second pressure relief valve 31.

The pressure valve which will cause the second pressure relief valve 31 to automatically open should be sufficient to prevent the take-up idler sprocket from recoiling when the crawler track 38 is driven through the top run of its path, and also this pressure value should be sufficiently low to prevent destructively overloading the tracks. In one example of the present invention, the pressure setting of the second pressure relief valve 31 was approximately twice the pressure setting of the first relief valve 18.

In the event track repairs are necessary, the track tension must be released and this is accomplished by fully opening the two bypass valves 16 and 29. When the track 38 is reassembled, the main bypass valve or control valve 16 and the second bypass valve 29 are closed and the tracks are automatically tensioned as described hereinabove.

The length of stroke of the fluid operated cylinder 34 is dependent upon the amount of take-up desired and is usually a minimum of one track pitch length to provide a sufficient reverse travel length to satisfy recoil requirements and to permit assembling the crawler track chain on the sprockets.

From the foregoing, it will be noted that the present invention provides a track tightener or tensioning apparatus wherein the tension within the track is maintained within a range, the lower value of the range being determined by the pressure relief valve 18 and the upper end of the range being determined by the pressure relief valve 31. Furthermore, the particular arrangement of the hydraulic control system of the present invention requires only a single fluid transmission line extending between the pump 12 and each of the take-up units 26.

We claim as our invention:

1. In a crawler track-type vehicle having a pair of substantially parallel crawler tracks disposed on opposite sides of a frame, an automatic track tightening apparatus comprising:
   means forming a pair of idlers, each of said idlers having one of a pair of oppositely disposed track chains trained therearound and mounted for movement in a manner to increase or decrease the associated chain path;
   a pair of fluid operated means each having a cylinder and a piston slidable therein;
   mounting means connecting one of said cylinder and said piston of each said fluid operated means to a frame of a track-type vehicle;
   attachment means connecting the other of said cylinder and said piston of each said fluid operated means to an associated one of said take-up idlers to cause movement of said idlers in response to movement of said pistons relative to said cylinders;
   means forming a source of hydraulic fluid;
   pump means receiving hydraulic fluid from said source for supplying the same under pressure;
   a hydraulic control circuit interconnecting said pump means and said fluid operated means for regulating the pressure of fluid within said fluid operated means;
   a first pressure relief valve in said circuit and connected in parallel with said pump means for supplying fluid at a minimum pressure;
   a pair of second pressure relief valves in said circuit each of said second valves individually connected in series with said first valve and said pair of fluid operated means for individually preventing the pressure within each said fluid operated means from exceeding a predetermined value greater than the minimum pressure value maintained by said first pressure relief valve means;
   a pair of check valves each respectively connected in parallel with said second pressure relief valves and only permitting fluid flow therethrough from said pump to said fluid operated means;
   thereby to maintain the tension of the track chains within a range having a minimum limit determined by said first pressure relief valve and a maximum limit determined individually for the track chains by said pair of second pressure relief valves.

2. The apparatus of claim 1 wherein said control circuit includes bypass valve means moveable between open and closed positions and permitting fluid to be supplied to said hydraulic control circuit when in the closed position.

3. The apparatus of claim 1 wherein said hydraulic control circuit includes bypass valve means connected in parallel with said second pressure relief valve means and moveable between open and closed positions and permitting fluid to pass through said second pressure relief valve means when in the closed position.

4. The apparatus of claim 1 wherein said second pressure relief valves pass hydraulic fluid from said fluid operated means whenever pressure within said fluid operated means exceeds the predetermined maximum value.

5. The apparatus of claim 1 wherein the predetermined value at which said second pressure relief valves relieve pressure within said fluid operated means is approximately twice the minimum pressure maintained by said first pressure relief valve means.

6. In a crawler track-type vehicle having a pair of substantially parallel crawler tracks disposed on opposite sides of a frame, an automatic track tensioning apparatus comprising:
   means forming a pressurized source of fluid;
   a pair of separate fluid operated means for individually controlling tension of each of the pair of crawler tracks, each said means including an idler having one of the tracks trained therearound and mounted for movement in directions to increase or decrease the track path,
   fluid operated means having a cylinder and a piston slidable within said cylinder,
   mounting means connecting one of said piston and said cylinder to the frame,
   attachment means connecting the other of said piston and said cylinder to said idler for moving the same in response to movement of said piston relative to said cylinder;
   a pair of fluid control means for individually regulating the fluid pressure within each of said fluid operated means, each said control means including
      a first pressure relief valve preventing fluid pressure within an associated one of said fluid operated means from exceeding a predetermined maximum value, and
      check valve means only permitting fluid flow around said relief valve in a direction from said pressurized source to said fluid operated means;
   second pressure relief means maintaining said pressurized source below a predetermined value, which value is below the maximum pressure value maintained by said first relief valve means, thereby to regulate the minimum track tension; and
   conduit means separately connecting said second relief valve means to each of said fluid control means.

7. A method of automatically tensioning a pair of crawler track chains disposed on opposite sides of a track type vehicle, wherein the pair of track chains respectively are trained around a pair of movable members, each of the movable members being mounted for movement by respective ones of a pair of fluid operated means in directions to increase or decrease tension of the track chain, the improvement comprising the steps of:
   providing a common source of pressurized fluid to each pair of track chains;
   maintaining pressure of the fluid source at a predetermined minimum value;
   separately supplying pressurized fluid from the source at the maintained minimum pressure value and to each of the pair of fluid operated means respectively controlling tension of the pair of track chains;
   separately preventing pressure within each of the pair of fluid operated means from exceeding a predetermined maximum value above said minimum value by returning fluid to the supply source and from the fluid operated means which has the excessive pressure therewithin without increasing the pressure in the other of said fluid operated means, thereby to separately maintain the tension of each of the pair of track chains within a range having a minimum limit dependent upon the maintained pressure value of the supply source and separate maximum limits depending upon the higher maximum pressure at which fluid is returned from each of the fluid operated means to the supply source.

References Cited

UNITED STATES PATENTS

| | | | |
|---|---|---|---|
| 3,082,043 | 3/1963 | Orton | 305—10 |
| 3,101,977 | 8/1963 | Hyler | 305—10 |
| 3,108,387 | 10/1963 | Penote | 305—10X |
| 3,116,956 | 1/1964 | Maradyn | 305—10X |
| 3,310,127 | 3/1967 | Siber | 305—10 |

RICHARD J. JOHNSON, Primary Examiner

U.S. Cl. X.R.

74—242.14